UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

REGENERATIVE BRAKING SYSTEM FOR ELECTRIC MOTORS.

1,245,523.      Specification of Letters Patent.      Patented Nov. 6, 1917.

Application filed October 5, 1912, Serial No. 724,068. Renewed September 7, 1916. Serial No. 118,951.

*To all whom it may concern:*

Be it known that I, NORMAN W. STORER, a citizen of the United States, and a resident of Pittsburgh, in the county of Allegheny and State of Pennsylvania, have invented a new and useful Improvement in Regenerative Braking Systems for Electric Motors, of which the following is a specification.

My invention relates to systems of electric motor control and it has special reference to such systems as are adapted for use in electric railway service.

The object of my invention is to materially increase the efficiency of an electric railway distributing system, by effectively utilizing the energy, usually dissipated in the form of heat, which is released when railway vehicles are brought to rest from relatively high speed or are run down hill with the brakes set.

Another object of my invention is to provide a system of the aforesaid class, that shall embody means for utilizing and regulating the electric current generated in the motor armatures during the braking period, for efficiently retarding the car or locomotive with which the system is employed.

Another object of my invention is to provide automatic means for so regulating the field excitation of the motors during the braking period as to maintain a substantially constant braking current, while the motor speed is constantly decreasing.

Another object of my invention is to provide a system of control for railway vehicles for automatically governing a plurality of electric motors by connecting them successively in series and multiple circuit relation in order to accelerate the vehicle, and automatic means for independently connecting the motors across the supply circuit, when the voltages generated in the motor armatures during the braking period bear predetermined relations to the voltage of the line, whereby energy may be supplied to the line in retarding the vehicle.

Another object of my invention is to so associate an ordinary pneumatic brake equipment with a regenerative braking system, as to automatically apply the pneumatic brakes and to interrupt the regenerative circuit when the speed of the vehicle falls below a predetermined value.

A further object of my invention, is to provide a regenerative control system wherein the above-mentioned auxiliary brake apparatus automatically becomes effective upon the loss of the electric braking effort, by reason of the trolley leaving the overhead wire, for example.

While my invention is particularly adapted for the control of railway vehicles, it is not limited to any class of service and may be utilized in the control of automobiles and other road vehicles or in the control of cranes, hoists and other electrically operated devices.

When a large number of cars or trains are operated under ordinary railway service conditions in a confined area as, for example, in the subway of a large city, there is a large amount of energy dissipated in the form of heat in frequently retarding the cars or trains by the application of airbrakes or any other of the well known braking appliances which have hitherto been available for this service. This energy is not only wasted, but becomes a very serious menace to the operation of the system. This is particularly true during the summer months when relatively high atmospheric temperatures prevail. In many cases, the heat in tunnels and subways becomes almost unbearable to passengers and necessitates the additional expenditure of large quantities of energy in providing cooling and ventilating apparatus. Furthermore, the capacities of electric driving motors are reduced by reason of the fact that they operate in atmosphere at high temperature, and it is evident that the problem is a very serious one.

It has been my aim to provide a practical arrangement capable of application to either a single car or to a plurality of cars controlled in multiple for automatically returning energy to the supply circuit of the system during the braking or retarding period of the vehicle or vehicles to which it is applied.

In order to adapt the system of control for this class of service and to secure a maximum braking effort without injuring the electric motors or the other apparatus with which the vehicle is equipped, I have provided automatic means, in the form of a differential relay switch, for automatically connecting a propelling motor to the supply circuit when the electromotive force generated at its terminals bears a predetermined relation to the voltage of the supply circuit.

I also provide automatic means for regulating the field excitation of the motor during the period when it is acting as a generator whereby a substantially constant braking current is delivered to the suppply circuit. In addition to the foregoing, I have so interlocked the various control switches and apparatus of the system as to permit of the normal series parallel operation of the motors in accelerating the vehicle, by adjusting the master controller in one direction, and of automatic adjustment of the circuits for regenerative braking accompanied by independent connection of the motors to the circuit at the proper time, by throwing the master controller in the opposite direction or by using a second master controller.

By utilizing the regenerative braking system in combination with the ordinary air brake apparatus, a large proportion of the energy ordinarily lost in heat is returned to the supply circuit, while, at the same time, the regenerative braking system is not relied upon when the speed of the vehicle is below a predetermined value. Consequently, the stop is accomplished in a minimum length of time and each of the two methods of braking is employed when it is most effective. The brake shoes are materially relieved from wear and will, of course, require very infrequent renewal.

Figure 1 of the accompanying drawings is a diagrammatic view of a system of electric motor control embodying my invention, the main circuit connections and the switches and control apparatus which are directly associated therewith being shown complete according to the usual diagrammatic methods of representation. The control circuits are, however, merely indicated by appropriately designated lines in order to avoid confusion.

Fig. 2 is a diagrammatic view of the control circuits including the actuating coils and the interlocks which form parts of the main circuit switches and control apparatus shown in Fig. 1. In order to simplify the circuit connections, however, the interlocks which, as shown in Fig. 1, are grouped with the various switches, are distributed and each of them is marked to indicate the switch or control device with which it is associated and by which it is operated.

Fig. 3 is a simplified diagrammatic view of the main circuit connections and certain of the auxiliary circuit connections during the period of regenerative braking.

Referring to Fig. 1 of the drawings, the system here shown comprises a supply circuit conductor which, for convenience, is marked "Trolley"; a return circuit conductor which is marked "Rail"; a pair of electric motors having armatures marked respectively M#1 and M#2 and field magnet windings marked respectively F1 and F2; two pair of line switches marked LS1, M1, LS2 and M2; a resistor section used only when the motors are connected in series relation and adapted to be short circuited by a switch S, a plurality of resistor sections one of which is short circuited by a switch R1, two of which are short circuited by a switch R2 and all three of which are short circuited by a switch R3; a second group of resistor sections, one of which is short circuited by a switch RR1, two of which are short circuited by a switch RR2 and all three of which are short circuited by a switch RR3; a pair of field regulating resistances FR1 and FR2 which are respectively provided with short circuiting switches X1 and X2, storage batteries marked respectively Bat. 1 and Bat. 2; a pair of controllers for governing the field regulating resistances, marked PK1 and PK2; a plurality of limit switches comprising A1, B1, C1 and L in one group, and A2, B2 and C2 in another group, a trip relay switch T, a plurality of control switches JR, J and G, differential relay switches D1 and D2 and a reversing switch marked "Reverser."

In order to avoid confusion, each resistor section will hereinafter be designated by the reference character which is applied to its short circuiting or excluding switch for example: The resistor short circuited by the switch S will be termed the S resistor. Similarly, one of the motors will be referred to as motor M#1, which is the reference character applied to its armature, and the other as motor M#2.

The operation of the system, with reference to the main circuits only will first be discussed and, subsequently the control circuits, by which the desired circuit changes are accomplished, will be traced.

Assuming that it is desired to accelerate the motors, switches LS1 and LS2, M1 and JR, X1 and X2 are first closed. With these switches closed, a circuit is established from the "trolley" through a main circuit conductor 70, the switches LS1 and M1, the series resistor S, the armature M#1, contacts 71 and 72 of the "reverser", the field magnet winding F1, reverser contacts 73 and 74, a conductor 75, the switch X1, a conductor 76, coils of the limit switches A1, B1, C1 and L, resistor sections R3, R2 and R1, a conductor 77, the switch JR, a conductor 78, resistor sections RR1, RR2 and RR3, the armature M#2, reverser contacts 80 and 81, the field magnet winding F2, reverser contacts 82 and 83, a conductor 79, the switch X2, a conductor 84, coils of the limit switches A2, B2 and C2, the coil of the trip relay switch T and a conductor 85 to the "rail". The motors are thus connected in series relation with all of the resistor sections included in the circuit, with the exception of the field regulating resistor sections FR1 and FR2 which are short circuited.

In the second to the eighth control steps inclusive, the switches S, RR1, R1, RR2, R2, RR3 and R3 are successively closed, gradually short circuiting the resistor sections and connecting the motors directly in series across the line.

The next three are transition steps in which the switch J is first closed, completing the short circuit connection from the conductor 76 to the armature M#2, the switches RR1 to R3 inclusive, and switch JR are next opened, and finally the switches M2 and G are closed.

In the ninth regular step of the controller, the switch J is permitted to open, leaving the two motors in parallel across the circuit, with the resistor sections R1, R2 and R3 in series with one of them and the sections RR1, RR2 and RR3 in series with the other.

In the subsequent accelerating steps, the resistor sections RR1 to R3, inclusive, are short circuited, leaving the motors in parallel relation directly across the circuit.

There are only two braking steps, one marked "braking", and the other "holding". In operation, only the braking step will be utilized if the vehicle is to be brought to rest, but, if it is only desired to slow down the vehicle or to hold it in descending a grade, the holding step may be utilized.

The braking step closes the switches M1, G, M2, S, R1 and RR1 and moves the controllers PK1 and PK2 from their "off" positions into their positions 1. By these means the switches X1 and X2 are opened and a plurality of switches Y1 and Z1 and Y2 and Z2 are closed.

Inasmuch as the line switches LS1 and LS2 are open, the motors are not connected to the line but Bat. 1 is connected in shunt relation to the field magnet winding F1 and the field regulating resistance FR1. Bat. 2 is similarly connected in shunt to field magnet winding F2 and the field regulating resistance FR2.

The line switches LS1 and LS2 are automatically and respectively dependent upon the differential relay switches D1 and D2 and, consequently, when a predetermined relation exists between the voltages generated at the terminals of the respective motor armatures and the voltage of the line, the motors are automatically and independently connected to the line by the closing of the corresponding line switches LS1 and LS2. After the motors are connected to the circuit, the controllers PK1 and PK2 are automatically regulated, as hereinafter pointed out, to so govern the field regulating resistances, with which they are associated, as to maintain a substantially constant braking current. This obviously involves the gradual exclusion of the regulating resistances in order to maintain substantially constant generated voltages at the terminals of the motors as their speeds decrease.

In the holding position, the actuators for the PK controllers are prevented from continuing to exclude the regulating resistance and, consequently, the braking effort exerted by the motors will decrease with the speed instead of continuing constant. In the case of descending grades, the speed will vary until the motor tractive effort just balances the accelerating effort corresponding to the difference between train resistance and grade acceleration, when the speed will remain constant.

The PK controllers are intended to be representative of any suitable means for automatically governing the field regulating resistances and I do not wish to be limited to any specific control apparatus.

Each of the PK controllers comprises a plurality of contact fingers 86, which are connected to intermediate points in the field regulating resistor with which it is associated; suitable contact ring segments 87, which are adapted to successively engage the fingers 86 and gradually short circuit the resistance in a well known manner; contact members 88 and 89, which form parts of the switches Y and Z, and a plurality of interlocking contact members and fingers co-operating therewith, which will be referred to in detail in the discussion of the control circuits.

Each of the controllers is preferably in the form of a drum, which is shown developed into a single plane in a well known manner, and is provided with a shaft 90 to which a pinion 91 is secured. Each of the drums is actuated by a rack 92 which meshes with its pinion 91 and is connected at its respective ends to pistons 93 and 94 which operate in cylinders 95 and 96. Fluid pressure is admitted from a tank or reservoir 97, through an electromagnetically controlled valve 98, to the cylinder 96, when an actuating coil 99 for the valve is deënergized, and fluid pressure is admitted from the tank or reservoir to the cylinder 95 when an actuating coil 100 for the magnet valve 101 is energized.

The arrangement of parts is such that if both magnet valves are deënergized, fluid pressure will be admitted through the valve 98 to the cylinder 96 and will so actuate the pistons 94 and the rack 92 as to throw the PK drum, with which it is associated, to its "off" position.

If valve magnet 101 is energized, fluid pressure will be admitted to the cylinder 95 but no motion of the drum will result, inasmuch as the pressures are then balanced on the two sides of the piston member. A motion of the drum may, however, be produced by subsequently energizing the coil 99 of the valve 98, since, by this means, the valve 98 will cut off the supply of pressure from the reservoir and will open its exhaust port. The drum may be stopped at any position by merely deënergizing the coil 99, and it may be returned to its off position by merely deënergizing both of the coils 99 and 100.

The valve magnet 101, which, when energized, is open to admit fluid pressure to the cylinder and, when deënergized, is closed to exhaust air from the cylinder, will hereinafter be referred to as a "standard" valve magnet, while the valve magnet 98 which is open to admit fluid pressure to the cylinder when deënergized, and exhausts the air from the cylinder when energized, will hereinafter be referred to as an "inverted" valve magnet.

The "reverser" may be of any suitable type, but preferably comprises a drum section which is adapted to occupy two positions, one for forward and the other for reverse operation of the vehicle. It is preferably pneumatically operated, and is controlled by valves having actuating coils 102 and 103.

The limit switches A1 and A2 are closed when energized above a predetermined value, and the switches B1 and B2, C1 and C2 and L are opened when energized above predetermined values.

Each of the differential relay switches D1 and D2 is provided with a coil 104 which, when energized, tends to raise it, and a coil 105 which tends to hold it down.

The coils 104 are respectively connected in shunt relation to the armatures M#1 and M#2 when the PK drums occupy positions 1 to 8, inclusive, by reason of the engagement of contact fingers 106 with a contact member 107.

The coils 105 are similarly connected across the supply circuit when the PK drums occupy positions 1 to 8, inclusive, by reason of the engagement of contact fingers 108 with a contact member 109.

The other switches of the system are adapted to occupy two positions, one in which the main circuit is interrupted, hereinafter called the "switch out" position, the other in which the switch is closed and the circuit is completed, hereinafter called the "switch in" position. Each of the switches is closed when its coil is energized.

The switches may be, and preferably are, actuated pneumatically, the coil respectively associated with the switches being adapted merely to open valves to admit fluid pressure to cylinders for closing the switches in a well known manner. In fact, the construction of the main switches forms no part of my present invention and they may be actuated directly or indirectly, in any suitable manner.

Referring to Fig. 2 of the drawings, the control circuits here shown are governed by a master controller adapted to occupy an "off" position, accelerating positions 1, 2 and 3, a "braking" position and a "holding" position; and a master reverser adapted to occupy a forward position $f$ and a reversing position $r$.

Energy may be supplied to the control circuits and auxiliary apparatus from any suitable source, such as a "control battery" having a positive terminal which, together with its connected conductors, is marked B+ and a negative terminal which, with its connected conductors, is marked B−. Obviously, Bat. 1 and Bat. 2 may be employed for this purpose, if desired.

The arrangement of circuits is such that if the master controller is moved to its position 3, the motor acceleration will progress automatically until the motors are finally connected across the line in multiple circuit relation. If it is moved only to position 2, the acceleration will progress until the motors are connected across the line in series relation and, if moved only to position 1, the motors will be connected in series relation across the line with all of the accelerating resistance in series.

It is thus evident that automatic acceleration is provided for but that the progression may be delayed at several points according to the will of the operator or motorman.

Assuming that the master controller is moved directly from its "off" position to its accelerating position 3, that the master reverser has been thrown into its position $f$, and that the reverser occupies the position $r$, a control circuit is established from the control battery terminal and conductor B+, through a control cut-out switch, which is closed, a contact finger $f$ of the master reverser, a conductor $f$, a contact member 4 of the master controller, a control conductor 4, contact member 110, a coil $f$ of the reverser, a conductor 49, and M1—out, to conductor B−. Another circuit is established from conductor B+, contact fingers B+ and 2 of the master controller, control conductor 2, PK1—off, actuating coil of switch LS1, conductor 47, through the trip relay switch T to B−. From control conductor 2 another circuit is established through PK2—off, conductor 48, coil of switch LS2, conductor 47, and the relay switch T to conductor B−. Thus, the reverser is thrown to position $f$, in which position it is shown, and the line switches LS1 and LS2 are closed.

A control circuit is established through the contact member 110 to control conductor R, from which point circuit is completed through the actuating coil of the switch M1, conductor 12 and the relay switch T to conductor B—. A circuit is also established from conductor R, through contact member 111 of the switch J—out, through conductor 23, contact member M2—out, conductor 24, contact member PK2—off, conductor 25, contact member PK1—off, conductor 26, and the actuating coil of the switch JR to conductor 12, circuit being completed as before. Thus switches M1 and JR are closed as soon as the reverser and the master reverser occupy corresponding positions.

The closing of these switches connects the motors in series relation with the various resistor sections included as above indicated. The current traversing the motor circuit is sufficient to raise the limit switch L in a well known manner. As soon as it is again closed by reason of the increased speed and counter-electromotive force of the motor armatures, another control circuit is established from finger B+ of the master control, through finger and control conductor 1, through the limit switch L, a conductor 20, contact member M1—in, a conductor 21, contact member JR—in, conductor 27, and the coil of S—limit to conductor 12. The switch S is thus closed, its coil being transferred in a well known manner from the actuating circuit just described, to a holding circuit established from the conductor R, through contact member 112. The actuating circuit which was completed through the coil of the switch S is now completed through contact member S—in, conductor 28, contact member 113, and the actuating coil of the switch RR1. This actuating circuit, however, is not completed until the limit switch L is again closed, provided the rush of current in the main circuit, produced by the exclusion of the resistor S, has been sufficient to open it.

Similarly, the coils of the switches R1, RR2, R2, RR3 and R3 are successively energized and transferred to the holding circuit in multiple relation, the said holding circuit extending through contact member 11 of switch J—out.

As soon as the R3 switch is in, a circuit is completed from control conductor 3, through contact member R3—in, conductor 44, member G—out, conductor 45, and the actuating coil of the switch J, to the conductor 12. The switch J, which completes the bridging circuit above referred to, is thus closed. In closing, it so actuates the contact member 111 as to interrupt the supply of energy to the holding circuit conductor 23, thereby permitting the resistance switches RR1 to R3, inclusive, and the switch JR to open. With the switch JR open, a circuit is established, dependent upon the limit switch L through contact member M1—in, conductor 21, contact member JR—out, conductor 22, and the actuating coils of the switches M2 and G to conductor 12. When the switch G is closed, the circuit through the actuating coil of the switch J is interrupted and, consequently, switch J is opened and the motors are connected in multiple circuit relation, the resistor sections R1, R2 and R3 being included in series with the motor M1 and the resistor sections RR1 RR2 and RR3 being included in series with the motor M#2.

It will be observed that the holding circuit of the switch S is independent of the position of the switch J, and, consequently, the switch S remains closed, during the complete operation of the controller, after it has once been actuated.

The resistor sections are again short circuited, dependent upon the limit switch L, a substantially balanced relation being maintained between circuits of the two motors by reason of the fact that the switches, which close in succession, are selected alternately from the two groups. The switch JR remains open on account of the contact member M2—out, which makes it impossible to close both the switches JR and M2 at one time. This is particularly important since the switch JR will short circuit the line if it is closed when the switches M1, M2 and G are closed.

Assuming that the vehicle propelled by the motors M#1 and M#2 is operating at or above a predetermined rate of speed, and that the master controller is returned to its off position, permitting all of the switches to open, and is moved to its braking position; under these conditions, energy is first supplied from the B+ finger of the master controller to a finger 8, one circuit being completed through control conductor 8, contact member R3—out, conductor 52, contact member PK1—off, and conductors 56 and 58 to the actuating coils 99 and 100 of the valve magnets which are associated with the controller PK1. Another pair of circuits is established from conductor 8, through a contact member RR3—out, conductor 53, a contact member PK2—off, conductors 60 and 61 and coils 99 and 100 of the valve magnets associated with the controller PK2.

Thus, the valve magnets associated with the PK controllers are energized, air being exhausted from the cylinders 96 and admitted to the cylinders 95. This results in moving the PK controllers from their off positions into their positions 1, in which the circuits through the inverted valve magnet coils 99 are interrupted, and the circuits through the standard valve magnet coils 100 are maintained, by reason of the peculiar shapes of the contact members PK1 and PK2 that are included in the said circuits.

Full pressure exists in each of the cylinders 95 and 96 and, consequently, the controllers remain in position 1. Another circuit is established from the finger B+ of "master reverser", through a contact member and a conductor f which is now connected through a contact member 114 of the "master controller" to finger 5, circuit being completed through the conductor 5, a contact member 115 of the "reverser" and a magnet coil r to the conductor 49, from which point circuit is completed through contact member M1—out to conductor B—.

The "reverser" is thus thrown to the opposite position, although the position of the "master reverser" has not been changed.

Energy is then supplied through the contact member 115 to the control conductor R and the coil of the switch M1 which is, consequently, closed. Another circuit is established, since the PK controllers occupy their positions 1, from the conductor R to either contact member PK1—1 to 8, or contact members PK2—1 to 8, to conductor 22, from which point circuits are completed through the coils of the switches M2 and G to the conductor 12. As soon as the switches M2 and G are closed, a circuit is established from the conductor R, through contact member G—in, conductor 21, contact member M2—in and conductor 27 to the actuating coil of the switch S.

The switch S then closes and energy is supplied successively to the coils of the switches RR1 and R1. The resistor sections S, RR1 and R1 will thus be short circuited. The closure of the switches will not proceed as in the case of acceleration from R1 to R3, inclusive, by reason of the contact member PK2—off, which is introduced between conductor 30 and conductor 31. At this stage of the control operation, a connection is established, although the circuit is not completed because the switch LS1 is open, from one terminal of line switch LS1, through the switch M1, which is closed, the switch S, the motor armature M#1, the field magnet winding F1, in the reverse direction, the resistor FR1, which was introduced when the controller PK1 moved into its position 1, the coils of the limit switches A1, B1, C1 and L, the resistor sections R3 and R2 and the switch G to the "rail."

The field magnet winding F1 and the resistance FR1 are bridged by Bat. 1, since the switches Y1 and Z1 are closed in this position of the controller PK1. The motor M#2 is similarly connected with reference to the controller PK2 and the regulating resistance FR2, resistor sections RR2 and RR3 being included in the connection. Circuit is not established, however, since line switch LS2 is open.

The storage batteries serve to excite the field magnet windings with which they are associated, and inasmuch as the vehicle is assumed to be operating at a relatively high speed, the motors will act as generators the voltages of which are dependent upon the speed. When the circuits are in the condition just described, however, the generated electromotive forces are somewhat lower than the electromotive force of the supply line and, consequently, the differential relay switches remain down.

When the controller PK1 has been moved to its position 1, a circuit is established from control conductor 8, through contact member PK1—1 to 8, conductor 50, differential relay D1—down, conductor 54, limit switch B1—down, conductor 55, contact member LS1—out, conductor 56, coil 99 of the valve magnet of PK1, to conductor 9, circuit being completed from conductor 9, through contact member 116 of the master controller to finger B1— which is connected through conductor B1— to the negative terminal of the battery. The standard valve magnet 100 of the controller PK1 is energized from conductor 54, through contact member LS1—out, conductor 65, limit switch C1, conductor 58 and the standard valve magnet 100 of the controller PK1 to conductor B—.

As soon as both of the valve magnets 99 and 100 are energized, the controller PK1 will move from its first position, through its second, third and fourth, etc., gradually excluding the field regulating resistance FR1 from the circuit until the voltage generated at the terminals of the motor armature reaches a predetermined value, which is in excess of the line voltage at least by an amount equal to the battery voltage, when the differential relay switch D1 will be raised. As soon as this occurs, the circuits just traced through the controller PK1, and the valve magnets 99 and 100 are temporarily interrupted. A new circuit is established from conductor 8, through conductor 52, R3—out, differential relay contacts D1A, conductor 57, contact member PK1—1 to 8, conductor 46, the actuating coil of the line switch LS1 and a conductor 47, which is connected to the negative conductor B1— through the relay switch T. Switch LS1 then closes and motor M#1 is connected to the supply circuit with the resistor sections R2 and R3 included to limit an excessive rush of current.

Upon the raising of the switch D1 and the consequent above-mentioned interruption of the two valve magnet circuits, the PK1 controller moves toward its "off" position to cut in resistance, in a manner hereinbefore explained. The amount of backward movement and, consequently, the amount of resistance inserted into the circuit is determined by a stationary stop 118 that engages a slip-segment 117 which is associated with the PK drum by a friction clutch connection. The arrangement of parts is such that a predetermined backward movement of the drum is produced, irrespective of its position when the differential relay switch is raised, until the contact segment 117 bridges the gap in the circuit of the standard valve magnet that was caused by the removal of the contact member LS1—out, when the switch LS1 closed. The other gap in the circuit, namely, that at the contact members D1B, is closed by a contact member LS1—in as soon as the switch LS1 closes. The standard valve magnet coil is thus energized, and the PK controller is held balanced in whatever position it then occupies. It should be noted that the contact segment 117 is sufficiently wide to bridge the space between the "off" position and position 1, thereby preventing the PK controller from dropping back beyond its first "on" position which would entail the opening of the line and motor circuit switches.

The backward movement of the PK drum reinserts a certain amount of the field regulating resistance FR1, just at the time when the motor is connected to the line. This is particularly important because the direction of current in the battery is immediately changed since it is connected in series relation to the motor armature, by the braking current. Its voltage is, therefore, suddenly raised and the field magnet winding F1 is, consequently, very much strengthened, and tends to suddenly increase the braking current. Just sufficient field regulating resistance, however, is reinserted to decrease the field strength and thus avoid excessive rush of current and excessive armature voltage. It is evident from the foregoing that the battery holds the field current substantially constant and either supplies energy to the field or absorbs the difference between the field current and the armature current in effecting this regulation. Since the battery is being charged during a part of the time it is in operation, its capacity may be relatively small.

As soon as the PK drum comes into action after the motor has been connected to the line and the reduction in motor current has permitted the limit B1 to drop, the resistors R2 and R3 are excluded from circuit progressively and in accordance with the action of the limit B1 by the closure of the corresponding resistor switches.

When the R3 switch is closed, the PK drum will remain stationary until the braking current diminishes, by reason of the decrease in the motor speed, to a predetermined value, at which the limit switch B1 will close. This value may, for example, be 120 amperes. When the limit switch B1 is closed, provided the resistance switches R2 and R3 are also closed, a circuit is established from the conductor 54, through the aforesaid limit switch, conductor 55, contact member LS1—in, conductor 35, contact member PK1—1 to 8, conductor 33, contact member R2—in, conductor 36, contact member PK1—1 to 8, conductor 37, contact member R3—in, conductor 40, interlock PK1—1 to 8, conductor 41, contact member LS1—in, conductor 56 and the magnet coil 99 to conductor 9.

The inverted valve magnet coil is thus energized whenever the limit switch B1 is closed and, consequently, permits a series of forward movements of the controller sufficient to reduce the field regulating resistance FR1 and to keep the braking current in excess of 120 amperes or some other predetermined value.

If the braking current should, when the resistance switch R3 is in, exceed a predetermined higher value, such as 160 amperes, the limit switch C1 will open and will suddenly bring the controller to rest. This action is effected by contact member 119 which is connected in shunt to the limit switch C1 and is limited to a very small movement by a stationary stop 120 and is connected to the drum by a friction clutch connection, the arrangement of parts being such that it requires a very small backward movement of the drum to re-establish a balanced condition between the pressures in the cylinders 95 and 96.

Thus, it is evident that the limit switches B1 and C1 hold the braking current within a predetermined value, irrespective of the speed at which the motor is operated. Under normal braking conditions, the regulating resistor FR1 will, of course, be gradually excluded until it is entirely short circuited.

When either of the controllers PK occupies its position 8, a circuit is established from the finger B+ of the master controller through a finger $x$, a conductor $x$ one or both of a pair of contact members PK1—8 and PK2—8, a wire 130 and a coil 131 of a relay switch 132 to the conductor B—. When the switch is closed, a holding circuit is established from the conductor $x$ to the conductor 130, independently of the controller PK through an upper pair of contact members 133 of the switch 132.

A lower pair of contact members 134 are also bridged when the switch is closed and complete a circuit from conductor B+ to conductor B— through a coil 135 of a magnet valve 136. This valve, when energized, closes an exhaust port 137, opens an admission port 138 and admits pneumatic pressure from a tank or reservoir 139 to a brake cylinder 140.

This cylinder and valve are intended to represent any well known system of pneumatic brakes which may be independently controlled in the usual manner but which are automatically applied when either of the controllers PK occupies its position 8.

The circuit through the $x$ wire is, of course broken when the master controller is returned to either its "holding" or its "off" position.

When the mechanical brakes are applied, the regenerated braking current will, of course, diminish rapidly as the motor speed is reduced. Finally, when the speed of the vehicle reaches a relatively low value, such as, for example, 12 miles an hour, the A1 limit switch will fall and will interrupt the circuit of the coil of the line switch LS1, which thereupon opens, and cannot again be closed by reason of the interruption of the circuit between conductors 52 and 57 by the contact member LS1—in which bridges the differential relay switch contact member D1—in.

The arrangement and operation of the interlocking contact members and circuit for connecting the motor M#2 to the line and regulating the field resistor FR2, correspond exactly to the above-described arrangement and operation for the motor M#1, the resistor sections RR2 and RR3 being utilized with the motor M#2 in place of the resistor sections R2 and R3.

It will be observed that the two motors are independent of each other and, consequently, one may be connected to the line for braking somewhat ahead of the other, although both will probably be connected to the line at about the same time.

In the present system, the P. K. controllers remain in the final position, until the master controller is returned to its "off" position by reason of the energization of the circuits of both actuating coils of each controller under the conditions just described, as about to be traced in detail. It will be understood that, if desired, suitable provision may be made to return the controllers to their "off" positions, prior to such movement of the master controller, although such an action is not necessary, since the main circuits are already opened by the line switches. The air brakes will not be released, however, so long as the master controller occupies its "braking" position. A single battery may be utilized instead of a separate battery for each motor, but I prefer the latter arrangement by reason of the fact that the battery voltage is found to increase rapidly when the motor is thrown on the line and, accordingly, if a single battery is relied upon for both motors and one of the motors becomes connected to the line first, the battery voltage may be so varied as to materially interfere with the operation of the differential relay in connecting the second motor to the line.

Another feature of importance that is embodied in my system is the automatic application of the air-brakes, or other auxiliary braking equipment of the vehicle, whenever the electric retarding effort ceases or is greatly weakened. This results from the fact that, upon the loss of regenerated current by reason of the trolley leaving the wire or other interruption of main-circuit connections, which causes the low-current limit switches A1 and A2 to drop and thus effect the opening of the line switches LS1 and LS2, the following circuits are formed.

One circuit is continued from the conductor 8, which is energized from the master controller in either the "braking" or "holding" position, through interlock PK1—1 to 8, conductor 50, contact members D1B of the differential relay D1 in its lower position which corresponds to low motor voltage, conductor 54, contact members of the limit switch B1 in its lower position, conductor 55, interlock LS1—out, conductor 56, and actuating coil 99 of the inverted valve of the controller PK1 to the negatively-connected conductor 9. A further circuit is completed from the conductor 54, through interlock LS1—out, conductor 65, contact members of the limit switch C1 in its lower position, conductor 58 and the actuating coil 100 of the standard valve of the controller PK1 to the negative conductor B—. Since both actuating coils of the controller PK1 are simultaneously energized, the controller moves rapidly from whatever position occupied to the final position 8, in accordance with previously-stated principles. Thus, the air-brakes are automatically actuated in the manner hereinbefore set forth, as soon as the controller reaches its last position.

It will be understood, without a detailed tracing of the circuits, that the controller PK2 acts similarly to the other controller PK1.

While the master controller is provided with a braking and a holding position, the holding position differs from the braking position only in that the circuits of the inverted valve magnet coils 99 are interrupted. By this means, the progression of the PK controllers may be arrested at any point and so cause the speed of the vehicle to decrease more slowly or continue at a constant speed if it is operating down hill. This enables the operator, by moving his controller from one position to the other, to regulate the rate of retardation or to hold any speed on down grade. In a good many cases, however, it may be found advisable to omit the holding position entirely and provide only for the automatic braking.

Independently operated switches may be substituted, as above indicated, for the PK controllers, and it may be found desirable to utilize separate resistances and, in some cases, separate line switches for governing the braking connections as distinguished from the accelerating connections of the system.

In order to return to the line a larger proportion of the energy necessarily used in stopping a vehicle, the driving motors may first be connected in multiple circuit relation until the vehicle speed is materially reduced and then connected in series relation, thereby enabling them to return energy to the line at a much lower speed, as set forth in my co-pending application, Serial No. 860,608, filed September 8, 1914.

If the motors are used on a local schedule car or train, which stops so frequently that the motors seldom attain their full speeds, it may be of advantage to connect the motor only in series during the regenerating period.

The circuit connections and the arrangement of the apparatus may, of course, be varied within the spirit and scope of my invention. The invention is, for example, not limited to a two motor controller, nor to a system having any specific arrangement of switches or motors, and I desire that only such limitations be imposed as are indicated in the appended claims.

I claim as my invention:

1. In a system of control, the combination with a supply circuit, an electric motor having an armature and a field magnet winding connected in series relation, a field regulating resistance adapted to be connected in series with the field magnet winding and an auxiliary source of energy for exciting the field magnet winding, of automatic means for connecting the motor to the supply circuit in order to return energy thereto and to retard the motor, when a predetermined voltage relation exists between the motor armature and the supply circuit.

2. In a system of control, the combination with a supply circuit, an electric motor having an armature and a field magnet winding connected in series relation, and a field regulating resistance which is normally short circuited when the motor is in operation and is adapted to be connected in series with the field magnet winding, of an auxiliary source of energy and means for introducing the field regulating resistance and connecting the auxiliary source of energy across the field and the regulating resistance, and automatic means connecting the motor to the supply circuit in order to return energy thereto and to retard the motor, when a predetermined voltage relation exists between the motor armature and the supply circuit, 3. In a control system, the combination with a supply circuit, an electric motor having an armature, and a field magnet winding, a normally short circuited field regulating resistance and means for separately exciting the field magnet winding, of automatic means for regulating said resistance and connecting the motor to the supply circuit when the voltage generated at the motor terminals exceeds the voltage of the supply circuit.

4. In a control system, the combination with a supply circuit, a series wound electric motor, a storage battery, a field regulating resistance and means for connecting the storage battery in shunt circuit relation to the field magnet winding and the field regulating resistance, of automatic means for connecting the motor to the supply circuit when the voltage generated at the armature terminals bears a predetermined relation to the supply circuit voltage.

5. A control system, comprising a supply circuit, a plurality of electric motors and means for successively arranging the motors in a series and in a multiple circuit relation for accelerating and operating the motors, and for independently establishing regenerative braking circuits for the several motors and maintaining substantially constant braking currents as the motors are retarded.

6. A control system comprising a supply circuit, a plurality of electric motors, means for either connecting the motors successively in a series and in a multiple circuit relation for accelerating and operating the motors, or independently connecting the several motors to the supply circuit for returning energy thereto and maintaining substantially constant braking currents as the motors are retarded.

7. A control system, comprising a plurality of electric motors, control means for effecting the acceleration and operation of the motors, and other control means for regulating the field excitation of the motors and severally connecting them to the supply circuit in order to return energy thereto.

8. In a control system, the combination with a plurality of electric motors, control means for effecting the acceleration and operation of the motors, and other control means for regulating the field excitation of the motors and severally connecting them to the supply circuit in order to return energy thereto, of a single means for governing the two control means.

9. In a control system, the combination with a plurality of electric motors, control means for effecting the acceleration and operation of the motors, and other control means for regulating the field excitation of the motors and severally connecting them to the supply circuit in order to return energy thereto, of a master controller adapted to govern one of said control means when adjusted in one direction and to govern the other set of control means when adjusted in the opposite direction.

10. In a control system, the combination with a plurality of electric motors, control means for effecting the acceleration and operation of the motors, and other control means for regulating the field excitation of the motors and severally connecting them to the supply circuit, of a master controller for governing the aforesaid control means, one of said control means embodying differential relay switches dependent upon a predetermined voltage relation between the supply circuit and the armatures of the several motors for connecting the motors to the circuit in order to return energy thereto.

11. In a control system, the combination with a supply circuit, an electric motor having an armature and a field magnet winding connected in series relation, and a field regulating resistance, of an auxiliary supply circuit adapted to be connected to the terminals of the field magnet windings and its regulating resistance, and a differential relay switch dependent upon a predetermined voltage relation between the supply circuit and the motor armature for connecting the motor to the supply circuit in order to return energy thereto when the motor is operating as a generator.

12. A system of control comprising a supply circuit, an electric motor having an armature and a field magnet winding, means for controlling the acceleration and operation of the motor, a field regulating resistance, an auxiliary source of energy, means for controlling the regulating resistance and connecting the auxiliary source of energy across the field magnet winding and its resistance and a master controller adapted to occupy one series of positions for governing the accelerating and operating control means and another set of positions for governing the control means for the field regulating resistance and the auxiliary source.

13. A control system comprising a supply circuit, an electric motor having an armature and a field magnet winding, a field regulating resistance, an auxiliary source of energy and a differential relay switch dependent upon a predetermined relation between the supply circuit voltage and the voltage across the terminals of the armature and a master controller adapted to occupy one set of control positions for governing the acceleration and operation of the motor and another set of control positions for effecting the introduction and control of the field regulating resistance, the excitation of the field magnet winding from the auxiliary source and the connection of the motor to the supply circuit for returning energy thereto, said last named connection being directly dependent upon the differential relay switch.

14. A system of control comprising a supply circuit, a series motor having an armature and a field magnet winding, means for regulating the field magnet winding, a storage battery connected in shunt circuit relation to the field magnet winding and the regulating means and adapted to receive energy from the armature circuit or deliver energy to the field circuit according as the armature current is greater or less than the field current.

15. A system of control comprising a supply circuit, a series motor having an armature and a field magnet winding, means for regulating the field magnet winding, a storage battery adapted to receive energy from or deliver energy to the armature and field circuit according as the armature current is greater or less than the field current, and means for connecting the motor to the supply circuit to return energy thereto when the motor is operating as a generator.

16. A system of control comprising a supply circuit, a series motor having an armature and a field magnet winding, a resistance connected in series with the field magnet winding, a storage battery connected in shunt relation to the field winding and the resistance, and adapted to receive energy from the motor circuit or to supply energy to the field magnet winding according as the armature current is greater or less than the field current when the motor is connected to the supply circuit for supplying energy thereto during the braking period.

17. A system of control comprising a supply circuit, a series motor having an armature and a field magnet winding, a resistance connected in series with the field magnet winding, means for connecting the motor to the supply circuit to return energy thereto during the braking period, means for regulating the resistance, a storage battery connected in shunt relation to the field winding and the resistance, and adapted to receive energy from the motor circuit or to supply energy to the field magnet winding according as the armature current is greater or less than the field current.

18. A system of control comprising a series motor having an armature and a field magnet winding, a mechanical brake apparatus, means for connecting the motor to the supply circuit to return energy thereto during the braking period, means for regulating the excitation of the field, and means automatically dependent upon the regulating means for actuating the mechanical brake apparatus.

19. A control system comprising a supply circuit, a series motor having an armature and a field magnet winding, a mechanical brake apparatus, an auxiliary source of energy and a regulating means for gradually strengthening the motor field to maintain a substantially constant braking current and to return energy to the supply circuit, and means dependent upon the field regulating means for automatically actuating the mechanical brake apparatus.

20. A control system comprising a supply circuit, a series motor having an armature and a field magnet winding, a mechanical brake apparatus, means for regulating the field magnet winding, a storage battery connected in shunt relation to the field magnet winding and the regulating means and means for connecting the motor to the circuit to return energy thereto during the braking period, said regulating means being adapted to hold the braking current substantially constant until the motor field is strengthened to a predetermined extent and to then actuate the mechanical brake apparatus.

21. A control system comprising a supply circuit, a mechanical brake apparatus, a series motor adapted to return energy to the supply circuit, and means for gradually strengthening the motor field as its speed is reduced, and automatic means dependent upon said field regulating means to actuate the mechanical brake apparatus.

22. A system of control comprising a supply circuit, a series motor having an armature and a field magnet winding, a mechanical brake apparatus, a resistance connected in series with the field magnet winding, means for connecting the motor to the supply circuit to return energy thereto during the braking period, means for regulating the resistance, a storage battery connected in shunt relation to the field winding and the resistance and adapted to receive energy from the motor circuit or to supply energy to the field magnet winding according as the armature current is greater or less than the field current, and automatic means dependent upon the resistance regulating means for actuating the mechanical brake apparatus.

23. In a control system, the combination with a series wound electric motor, a mechanical brake apparatus, and means for establishing a regenerative braking circuit and maintaining a substantially constant braking current as the motor is retarded, of means for automatically actuating the mechanical braking apparatus at a predetermined point in the retardation of the motor.

24. A system of control for braking an electric motor comprising a supply circuit, an electric motor having an armature and a field magnet winding, a variable resistance, an auxiliary source of current, means for connecting the said source and said resistance in circuit with the field magnet winding, means for regulating the said variable resistance in accordance with the current and electromotive force generated by the motor armature, and means for connecting the motor to the supply circuit when the voltage generated by the motor armature attains a predetermined value.

25. A system of control for braking an electric motor comprising a supply circuit, an electric motor having series connected armature and field magnet windings, a variable resistance, an auxiliary source of current, means for connecting the said source and said resistance in circuit with the field magnet winding, means for automatically regulating the said variable resistance in accordance with the current and electromotive force generated by the motor armature, and means for automatically connecting the motor to the supply circuit when the voltage generated by the motor armature attains a predetermined value.

26. A system of control for braking an electric motor comprising a supply circuit, an electric motor having an armature and a field magnet winding, a variable resistance, an auxiliary source of current, means for connecting the said source and said resistance in circuit with the field magnet winding, means for automatically connecting the motor to the supply circuit when the voltage generated by the motor armature attains a predetermined value, means for regulating the said variable resistance, and means controlling said regulating means whereby the current generated by the motor armature is maintained in excess of a predetermined value until the motor speed has diminished below a predetermined value.

27. A system of control for braking an electric motor comprising a supply circuit, an electric motor having an armature and a field magnet winding, a variable resistance, an auxiliary source of current, means for connecting the said source and said resistance in circuit with the field magnet winding, means for automatically connecting the motor to the supply circuit when the voltage generated by the motor armature attains a predetermined value, means for regulating the said variable resistance, and means controlling said regulating means whereby the current generated by the motor is maintained between predetermined values until the motor speed has diminished below a predetermined value.

28. A system of control for braking an electric motor comprising a supply circuit, an electric motor having an armature and a field magnet winding, a variable resistance, an auxiliary source of current, means for connecting the said source and said resistance in circuit with the field magnet winding, means for automatically connecting the motor to the supply circuit when the voltage generated by the motor armature attains a predetermined value, and means for regulating the said variable resistance to maintain the current generated by the motor armature in excess of a predetermined value until the motor speed has diminished below a predetermined value.

29. A system of control for braking an electric motor comprising a supply circuit, an electric motor having an armature and a field magnet winding, a variable resistance, an auxiliary source of current, means for connecting the said source and said resistance in circuit with the field magnet winding, means for automatically connecting the motor to the supply circuit when the voltage generated by the motor armature attains a predetermined value, and means for regulating the said variable resistance to maintain the current generated by the motor armature between predetermined values until the motor speed has diminished below a predetermined value.

30. A system of control for braking an electric motor comprising a supply circuit, an electric motor having an armature and a field magnet winding, a variable resistance, an auxiliary source of current, means for connecting the said source and said resistance in circuit with the field magnet winding, means for automatically connecting the motor to the supply circuit when the voltage generated by the motor armature attains a predetermined value, a controller for said variable resistance, means for actuating the same to increase or decrease the effective value of said resistance, and means for controlling said actuating means whereby the effective value of the said resistance is reduced when the current generated by the motor armature diminishes below a predetermined value and whereby the effective value of said resistance is increased when the current generated by the motor armature exceeds a predetermined value.

31. A system of control for braking an electric motor comprising a supply circuit, an electric motor having an armature and a field magnet winding connected in series relation, an auxiliary source of current, means for connecting the said source in circuit with the field magnet winding, and means for regulating the current in the field magnet winding of the motor to maintain the current generated by the motor armature between predetermined values until the motor speed diminishes below a predetermined value.

32. A system of control for braking an electric motor comprising a supply circuit, an electric motor having an armature and a field magnet winding, an auxiliary source of current, means for connecting the said source in circuit with the field magnet winding, and automatic means for regulating the current in the field magnet winding of the motor to maintain the current generated in the motor armature in excess of a predetermined value until the motor speed has diminished below a predetermined value.

33. A system of control for braking an electric motor comprising an electric motor having an armature and a field magnet winding, an auxiliary source of current, means for connecting the said source in circuit with the field magnet winding, a reversing switch for reversing the connections of the motor field magnet winding with respect to its armature, and means for actuating the said reverser when the motor is changed to a braking generator irrespective of the former position of the said reverser.

34. The combination with an electric motor, a load driven thereby and means for effecting regenerative operation of the motor for retarding the load until the motor speed has diminished below a predetermined value, of mechanical braking means for the load, and means independent of the regenerated current for automatically applying the mechanical braking means.

35. In a system of control, the combination with a supply circuit, an electric motor having an armature and a field magnet winding, of automatic means for connecting the motor to the supply circuit under predetermined relative conditions of the motor circuit and the supply circuit in order to return energy thereto and for maintaining said relative conditions.

36. In a system of control, the combination with a supply circuit, an electric motor having an armature and a field magnet winding connected in series relation, a field-regulating resistance adapted to be connected in series with the field magnet winding, and an auxiliary source of energy for exciting the field magnet winding, of automatic means for connecting the motor to the supply circuit for regeneration thereto under predetermined relative conditions of the motor circuit and the supply circuit.

37. In a system of control, the combination with a supply circuit and an electric motor having an armature and a field magnet winding connected in series relation and a field-regulating resistance which is normally inactive during motor operation and is adapted to variably control the energization of the field magnet winding during regenerative braking, of an auxiliary source of energy, means for introducing the field-regulating resistance and connecting the auxiliary source of energy across the field winding and the regulating resistance, and automatic means for connecting the motor to the supply circuit in order to return energy thereto and retard the motor under predetermined conditions.

38. In a control system, the combination with a supply circuit, an electric motor having an armature and a field magnet winding, a normally inactive field-regulating device, and means for separately exciting the field magnet winding, of means for operatively connecting said field-regulating device and the exciting means in circuit during regeneration, and automatic means for regulating said device in accordance with the regenerated current.

39. In a control system, the combination with a supply circuit, an electric motor having an armature and a field magnet winding, a normally inactive regulating device and means for separately exciting the field magnet winding, of automatic means for governing the operation of said field-regulating device and for connecting the motor to the supply circuit under predetermined relative electrical conditions of said motor and said supply circuit.

40. In a control system, the combination with a supply circuit, a plurality of electric motors, means for controlling said motors during acceleration and means for independently establishing regenerative braking circuits for said motors, of means for independently governing the operation of said motors during the regenerative period.

41. In a control system, the combination with a supply circuit and an electric motor adapted to be operated as a generator, of means for arranging the motor circuits for generator operation, means for automatically connecting said motor to a supply circuit under predetermined circuit conditions, and means for automatically maintaining a substantially constant braking current as the motor is retarded.

42. A control system comprising a supply circuit, a plurality of electric motors, and means for governing said motors during motor operation, of means for independently and automatically establishing regenerative braking circuits for said motors.

43. In a control system, the combination with a plurality of electric motors, means for controlling said motors during motor operation and other means for controlling said motors during regenerative braking, of automatic means for connecting said motor to the supply circuit under predetermined conditions and for maintaining said conditions, and manually operated means for governing said two controlling means.

44. In a control system, the combination with a plurality of electric motors, means for controlling said motors during motor operation and other means for regulating the field excitation of said motors and connecting them to a supply circuit, of means for governing said controlling means, one of said controlling means embodying electro-responsive apparatus for connecting the motors to the supply circuit in order to return their energy thereto.

45. A system of control comprising a supply circuit, a series motor having an armature and field magnet winding, means for regulating the excitation of said winding, an energy-accumulating device adapted to receive energy from or deliver energy to the armature and field circuit in accordance with predetermined current conditions, and automatic means for connecting the motor to the supply circuit for returning energy thereto when the motor is operating as a generator.

46. A system of control comprising a supply circuit, a series motor having an armature and field magnet winding, means for regulating the excitation of said winding, a storage battery connected in multiple relation to said winding and said regulating means and adapted to be charged or discharged in accordance with predetermined current conditions, and automatic means for connecting the motor to the supply circuit for returning energy thereto.

47. A system of control comprising an electric motor having an armature and field magnet winding, an auxiliary braking means, means for connecting the motor to a supply circuit for regenerative braking, and means for actuating said auxiliary braking means under predetermined conditions of regenerative braking.

48. A system of control comprising an electric motor having an armature and field magnet winding, an auxiliary braking means, means for connecting the motor to a supply circuit for regenerative braking, means for regulating the excitation of said field magnet winding during regenerative braking, and means dependent upon the operation of said regulating means for effecting the operation of said auxiliary braking means.

49. A system of control comprising an electric motor having an armature and field magnet winding, a normally inoperative fluid-operated braking apparatus, means for connecting the motor to a supply circuit for regenerative braking thereto, automatic means for regulating the regenerative braking operation, and means dependent upon predetermined conditions of said regenerative braking operation for rendering said fluid-operated braking apparatus effective.

50. A control system comprising a supply circuit, an electric motor having an armature and a field magnet winding, auxiliary braking means, means for regulating the field strength of said motor when operating as a generator for maintaining predetermined dynamic braking conditions, and means dependent upon the position of said regulating means for actuating said auxiliary braking means.

51. A control system comprising a supply circuit, an auxiliary braking means, a series motor adapted to return energy to the supply circuit, means for varying the motor field strength as the speed of the motor changes, and means indirectly dependent upon the speed of the motor for actuating said auxiliary braking means.

52. A control system comprising a supply circuit, an auxiliary braking means, a series motor adapted to return energy to the supply circuit, means for increasing the excitation of the motor field as the speed is reduced, means dependent upon said last means for actuating said auxiliary braking means, and means dependent upon predetermined regenerative current conditions for disconnecting said motor from said supply circuit.

53. In a control system, the combination with an electric motor, an auxiliary braking means, and means for establishing a regenerative braking circuit and maintaining a substantially constant braking current as the motor is retarded, of means for actuating the auxiliary braking means at a predetermined point in the retardation of the motor, and means for discontinuing the regenerative braking action.

54. A system of control for braking an electric motor comprising a supply circuit, an electric motor having an armature and a field magnet winding, a variable resistance, an auxiliary source of energy, means for connecting said source and said resistance in circuit with the field magnet winding, automatic means for regulating said variable resistance in accordance with predetermined circuit conditions, and means for connecting the motor to the supply circuit under predetermined relative conditions of said motor and said supply circuit.

55. A system of control for braking an electric motor comprising a supply circuit, said motor having an armature and field magnet winding, an auxiliary source of energy adapted to excite said field winding during the braking operation, an automatic means for regulating the braking current between predetermined values until a predetermined motor speed is attained.

56. A system of control for braking an electric motor comprising a supply circuit, a motor having an armature and field magnet winding, an auxiliary source of energy adapted to excite said field winding during the braking operation, an electro-responsive means for regulating the braking current and maintaining it in excess of a predetermined value until a predetermined motor speed is obtained.

57. A system of control for braking an electric motor comprising a supply circuit, a motor having an armature and field magnet winding, an auxiliary source of energy adapted to excite said field winding during the braking operation, means for reversing the field magnet winding, and means independent of the previous position of said reversing means for actuating said reversing means when the motor is changed to a braking generator.

58. A system of control comprising an electric motor adapted to be operated as a braking generator having an armature and field magnet winding, means for reversing the field magnet winding with respect to its armature, and means for actuating said reversing means when the motor is changed to a braking generator irrespective of the position of said reversing means.

59. The combination with an electric motor, a load driven thereby, and means for effecting regenerative braking of said motor, of auxiliary braking means adapted to be actuated under predetermined conditions which are independent of the motor circuit.

60. A control system comprising an electric motor adapted to be operated as a generator and having an armature and field magnet winding, a regulating resistance in circuit with said winding, a battery connected across said winding and regulating resistance, means for automatically connecting said motor to a supply circuit under predetermined circuit conditions, and means for temporarily inserting resistance into the motor circuit subsequent thereto.

61. A control system comprising an electric motor adapted to be operated as a braking generator, means for connecting said motor to a supply circuit under predetermined circuit conditions, and automatic means for temporarily inserting resistance into said motor circuit.

62. A control system comprising a supply circuit, an electric motor adapted to be operated as a braking generator, said motor having an armature and field magnet winding, a regulating resistance in circuit with said winding, an auxiliary source of energy connected across said regulating resistance and said winding, means for connecting said motor to said supply circuit under predetermined circuit conditions, and means for causing a portion of said regulating resistance to be temporarily inserted in the motor circuit subsequent to its connection to the supply circuit.

63. A control system comprising a supply circuit, an electric motor adapted to be operated as a braking generator and having an armature and field magnet winding, means for connecting said motor to said supply circuit, and automatic means for temporarily limiting the generated current.

64. A control system comprising a supply circuit, an electric motor adapted to be operated as a braking generator, and automatic means for raising the generated voltage to a predetermined relation to the voltage of said supply circuit and subsequently connecting said motor thereto.

65. A control system comprising a supply circuit, a plurality of electric motors adapted to be operated as braking generators, a plurality of means for automatically and independently effecting predetermined relative voltage conditions between said supply circuit and said motors prior to connecting said motors thereto.

66. A control system comprising a supply circuit, a plurality of electric motors adapted to be operated as braking generators, a plurality of means for automatically and independently effecting predetermined relative voltage conditions between said supply circuit and said motors and for subsequently and independently connecting said motors to said circuit.

67. In a control system, the combination with a supply circuit, an electric motor having an armature and field magnet winding, a regulating resistance in circuit with said winding, and means for maintaining a substantially constant voltage across said field winding and said regulating resistance when said motor is acting as a braking generator, of automatic means for connecting said motor to said supply circuit under predetermined relative voltage conditions of said supply circuit and said motor.

68. The method of operating an electric motor as a braking generator which consists in raising the generated voltage of said motor above the voltage of a supply circuit, connecting said motor to said supply circuit, temporarily inserting resistance in the motor circuit and subsequently regulating the braking current.

69. The method of operating a plurality of electric motors as braking generators which consists in automatically and independently raising the voltages of said motors to a predetermined value with respect to the voltage of a supply circuit and independently connecting said motors thereto.

70. In a system of control, the combination with a supply circuit and a dynamo-electric machine adapted for regenerative braking, of auxiliary braking means, means for regulating the field strength of said machine for normally maintaining predetermined regenerative conditions, means for interrupting the supply-circuit connection under certain abnormal conditions, means for thereupon actuating said regulating means to a predetermined position, and means for then rendering said auxiliary braking means effective.

71. In a system of control, the combination with a supply circuit and a dynamo-electric machine adapted for regenerative braking, of a mechanical brake apparatus, means for regulating the system to normally maintain substantially constant regenerative conditions, means for interrupting the supply-circuit connection upon a loss of regenerative current, means for thereupon actuating said regulating means to a predetermined position, and means dependent upon such a actuation for effecting the operation of said brake apparatus.

72. In a system of control, the combination with a supply circuit and a dynamo-electric machine adapted for regenerative braking, of a mechanical braking apparatus, means for automatically actuating said apparatus under predetermined regenerative braking conditions, and means dependent upon the results of such actuation for rendering the regenerative braking system inoperative.

73. In a system of control, the combination with a supply circuit and a dynamo-electric machine adapted for regenerative braking, of a mechanical braking apparatus, means for automatically actuating said apparatus under predetermined regenerative conditions, and relay means actuated in accordance with the resultant decrease of regenerated current for rendering the regenerative braking system inoperative.

74. In a system of control, the combination with a supply circuit and a plurality of dynamo-electric machines adapted for regenerative operation, of means for automatically raising the voltages of said machines to predetermined values, and means for thereupon connecting the machines to said supply circuit independently of each other.

75. In a system of control, the combination with a supply circuit and a plurality of dynamo-electric machines adapted for independent regenerative operation, of means for automatically raising the voltages of said machines to predetermined values, and relay means for thereupon connecting the machines to said supply-circuit independently of each other.

76. In a system of control, the combination with a supply circuit and a series-wound dynamo-electric machine adapted for regenerative operation, of means for automatically raising the voltage of said machine to a predetermined value, and means for thereupon automatically connecting the machine to said supply circuit.

77. In a system of control, the combination with a supply circuit and a dynamo-electric machine adapted for regenerative operation, of auxiliary exciting means for automatically raising the voltage of said machine to a predetermined value, and relay means for thereupon automatically connecting the machine to said supply circuit.

In testimony whereof, I have hereunto subscribed my name this fourth day of October, 1912.

NORMAN W. STORER.

Witnesses:
O. BIELER,
B. B. HINES.